Nov. 3, 1953          P. ARBEIT ET AL          2,658,095
PROCESS AND APPARATUS FOR MAKING GLASS
Filed July 7, 1945                        2 Sheets-Sheet 1
Fig. I
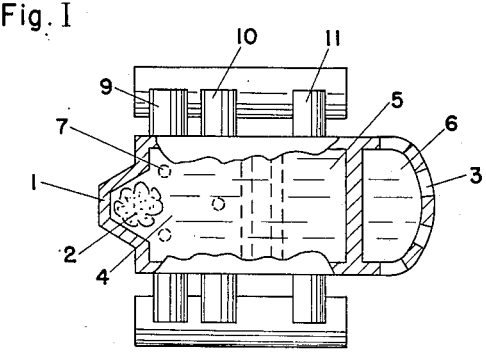
Fig. II
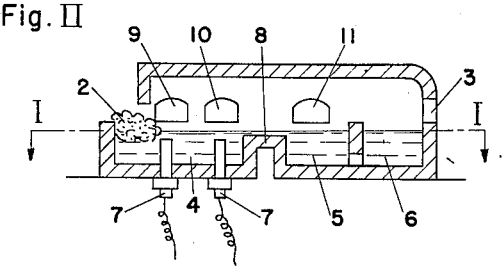
Fig. III
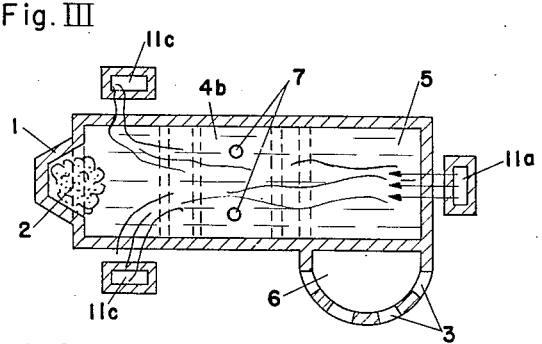
Fig. IV
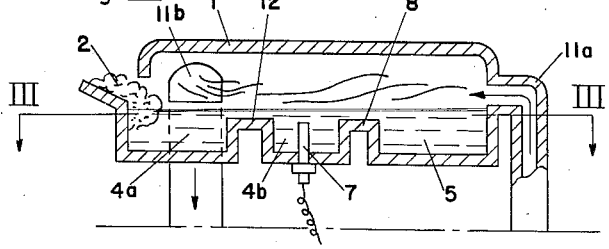
*INVENTORS.*
PIERRE ARBEIT
ROBERT DUBOIS
ROGER EMILE LAMBERT
BY
Dale A. Bauer
ATTORNEY.

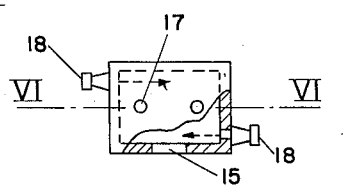
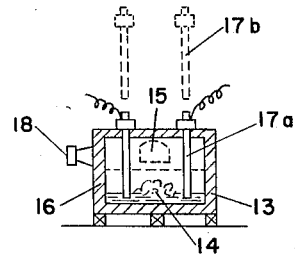
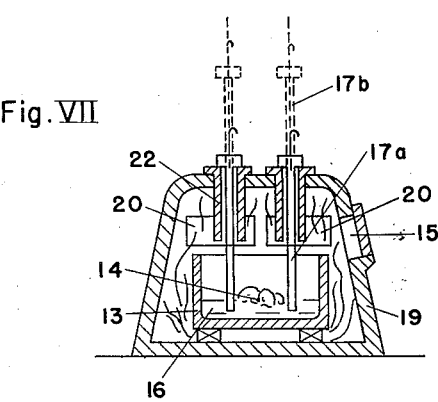
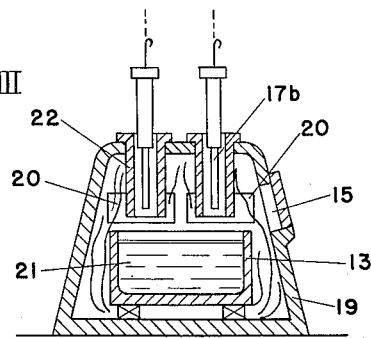

Patented Nov. 3, 1953

2,658,095

UNITED STATES PATENT OFFICE 2,658,095

PROCESS AND APPARATUS FOR MAKING GLASS

Pierre Arbeit, Paris, Robert Dubois, Bagneaux-sur-Loing, and Roger Emile Lambert, Paris, France, assignors to Societe Anonyme des Manufactures des Glaces et Produits Chimiques de Saint-Gobain, Chauny & Cirey, Paris, France Application July 7, 1945, Serial No. 603,727
In France May 5, 1944

Section 1, Public Law 690, August 8, 1946
Patent expires May 5, 1964

15 Claims. (Cl. 13—6)

The present invention refers to a method for the manufacture of glass and particularly for the heating required to melt the glass-making materials and to refine the glass.

Such a manufacture necessitates high temperatures, and great advantages are derived, for heating the glass, from the method consisting in passing an electric current through the molten glass bath. Such a method develops the heat within the glass mass. Moreover it is not based, as is the heating by a source exterior to the glass, on a necessary difference of temperature between the heating source and the glass, and it has not the drawback, as does heating by flames, of considerably decreasing in efficiency when and as the temperature of the glass increases.

Consequently it seemed advisable to try to use the passage of the electric current through the bath for producing glass requiring very high temperatures, such as hard glasses, or glasses having a low expansion coefficient, containing boric acid. But the means which were heretofore proposed did not obtain perfect results, as the produced glass was somewhat colored. Furthermore, such heating method when used in the production of ordinary glass, while giving good results in many cases, had not yet obtained a regular production of "extra-white" glasses.

Our present invention has for its object a method for the manufacture of glass in which the heating is obtained by passing an electric current through the glass bath, said method producing the advantages of such heating without any of the inconveniences in respect of coloration which were previously met.

Our method consists in heating the glass in the course of the melting period by means of an electric current supplied by electrodes in contact with the glass to be elaborated, and in suppressing the contact of the glass with the electrodes when the melting is ended, i. e. when the glass is ready to be refined or before that time, the refining being accomplished thereafter by any suitable heating means except those comprising electrodes supplying an electric current to the glass bath.

When thus limiting the use of an electric current passing through the glass between electrodes to the period preceding the refining, we ascertained that it is possible to produce non-colored glass while having the glass maintained in contact with the electrodes during a sufficient time to enable it to benefit from the high temperatures which can be easily developed in the neighbourhood of the electrodes, and while using graphite electrodes, which withstand very high temperatures, but have a tendency to color the glass.

It is known that graphite, when in contact with glass, by its reducing action on some elements of the glass constituents, causes a coloration of the glass mass which seems due to the presence either of finely divided carbon particles or of sulfides. The process according to our invention avoids such disadvantage in respect of the coloration and it produces very satisfactory products from that viewpoint; this result seems due to the fact that the electrodes are left in contact with the glass only during the melting period, i. e. the period during which, in the course of its elaboration, the glass still contains oxidizing substances introduced by the glass making materials, as such oxidizing substances prevent the formation of compounds coloring the glass, or, by their combination with such compounds, yield non-colored products. If such action of the oxidizing substances contained in the glass while it is elaborated is not ended when the contact of the glass with the electrodes is suppressed, it may be completed during the refining period, owing to the time elapsing between the moment when the glass leaves the contact with the electrodes, and the time when the glass is withdrawn from the tank.

The method according to our invention may be used in cases of continuous or of discontinuous production, i. e. in the operation of a continuous tank having a constant level, where the batch materials are constantly fed at one end while the finished glass is constantly withdrawn at the other end, or in the operation of a container for a daily production where the batch materials are admitted and melted at a certain time of the day and the refining and withdrawal of the glass take place at another time.

In the case of continuous furnaces, our invention may be carried out by localizing the electrodes in the part of the tank where the proper melting operations are taking place, i. e. without placing any electrode in the refining compartment, and by interposing, between the compartment containing the electrodes and the refining compartment, means for suppressing or at least considerably limiting the currents of the refined glass coming back to the compartment containing the electrodes. In that way, the refined glass is prevented from coming back in contact with the electrodes. Such means may consist, for example, of a barrier having a shallow channel near the upper level of the bath but permissibly extending the whole width of said bath.

In the case of discontinuous operation, the invention is carried out by limiting the presence of the electrodes in the glass to the period during which the glass making materials are melted, such electrodes being removed from the bath as soon as the container is filled with molten glass ready to be refined, or before that time.

In both cases of continuous and discontinuous productions the heat necessary for refining is produced by any suitable means except those consisting of electrodes supplying an electric current to the glass mass, such as, for instance, gas or oil burners, electric resistors, or by electric currents developed in the glass mass by induction.

The special method of heating the glass bath by electrodes which is the object of our invention may be associated, for the melting itself, with heating means outside the glass, for instance a heating above the glass bath, or a heating completely surrounding it. All other conditions referring to the electric heating being unchanged, such arrangement decreases the duration of the melting operation and consequently reduces the time during which the electrodes are in contact with the glass. It is thus possible while avoiding the degradation of the glass, to raise to a higher degree the temperature developed within the glass mass by the electric current during the melting.

Various characteristics of the invention and its advantages will clearly appear in the following description referring to the annexed drawings which show, only as examples, some embodiments of the process according to the invention:

Figures I and II respectively show plan and vertical sections of a continuous furnace according to the invention;

Figures III and IV respectively show plan and vertical sections of another embodiment of a continuous furnace according to the invention;

Figures V and VI show a plan view and a vertical section of a discontinuous furnace for working out the invention;

Figures VII and VIII are sectional vertical views of a similar discontinuous furnace at two different stages of its operation.

In the continuous furnace shown in Figures I and II the tank 1 has, at one of its ends, a doghouse 2 through which the batch is fed and, at the other end, openings 3 through which the finished glass is taken off. The tank comprises successively the melting compartment 4, the refining compartment 5 and the extraction compartment 6 in which the glass is brought to suitable working temperature.

An electric current is supplied to the glass by means of electrodes 7 located in the melting compartment 4. These electrodes are placed vertically and penetrate through the bottom of the tank.

In conformity with the invention, no electrode is placed in the compartment 5 and, moreover, a partition 8 constituting an obstacle is interposed between compartments 4 and 5. Such partition is so arranged that it lets the glass flow from compartment 4 to the compartment 5, but it prevents it from flowing back from compartment 5 towards the electrodes 7. Such result may be obtained by providing in the partition 8 an orifice for the passage of the glass, the section of which is so small that the flow of glass from compartment 4 to compartment 5 due to normal withdrawal of glass leaves no room for the passage of any back current. Such orifice may be situated at any level in the partition 8 separating the compartments 4 and 5, but is advantageously provided, as shown in the drawings at the upper level of the glass bath, the partition thus constituting a channel of small depth beneath the glass level.

A heating by flame ports 9 and 10 in the melting compartment is associated with the electric heating. The glass is heated in the refining compartment by flame ports 11.

In Figs. III and IV the tank differs from the precedingly described tank by the fact that the zone of action of the electrodes, i. e., the zone where the electric current passes in the melting compartment is limited to a portion of said melting compartment, i. e. at the portion 4b immediately preceding the refining compartment. A partition 12, arranged as partition 8, separates such compartment 4b from the preceding compartment 4a into which the batch materials are fed and where the melting begins. Such partition 12 prevents the glass which passed from 4a to 4b from coming back to compartment 4a. Thus the action of the electric current is localized in a comparatively reduced quantity of glass owing to the fact that the volume of compartment 4b is itself reduced, and that, in said compartment, the glass is renewed only by the draught produced by the glass withdrawn from the tank, no glass being brought into it by convection currents.

Flames issuing from a port 11a run through the whole furnace and go out through outlets 11b and conducts 11c. Such flames, which are always directed from 11a to 11b ensure particularly at their exit from port 11a, the strong heating required for the refining in compartment 5. To that end, the combustion will be controlled so that the hottest part of the flame will be at the head of same, while the tail of the flame can be, without any inconvenience, the less hot part, as it is used only to heat the fed batch materials which are at a comparatively low temperature.

Such an arrangement is particularly advantageous for the manufacture of hard glass containing boric acid, which requires a very high refining temperature and can be worked only at a high temperature. In the shown arrangement, the extraction compartment 6 has the benefit of proximity to the hottest part of the flames.

The localization of the electrodes in the compartment 4b affords the advantage that, when penetrating into 4b, the glass has already been heated by the flames in compartment 4a, and, as a result of its temperature presents good electrical conductance that immediately carries an electric current having a high intensity.

For installations which are equivalent from the electric point of view, the developed energy is consequently greater with such an arrangement than in the case where the current passes through the whole melting compartment 4. The duration of the melting is thus shortened and, with a tank having the same volume, it is possible to obtain a greater hourly production with a smaller duration of contact of the glass with the electrodes.

In Figs. V and VI, the container 13 is a day-tank for discontinuous production. During a first period of the manufacturing cycle, the glass making materials are inserted and melted by successive portions, until the container is filled with molten glass. The glass is refined during the following period.

Fig. VI represents the tank during the first period; the batch materials 14, having been fed through the hole 15, are lying on the already molten glass 16. During said first period the electrodes 17, located at the position 17a, are in contact with the glass and cause the current to pass through the glass mass. At the end of the melting, or before the melting is ended, the electrodes 14 are raised and brought to position 17b out of the tank. From that time the tank is heated by flame burners, for instance oil burners as shown at 18.

It is advantageous to operate the burners 18 during the melting period, to associate heating means exterior to the glass with the electric heating by electrodes 17, thus obtaining the hereabove mentioned advantages resulting from said combination. In particular, the burners 18 may be usefully started during the first period to heat the first batch material in order to render same conductive for the current.

Devices, not shown, may be provided to protect the electrodes in the furnace or against their oxidization when they are out of the furnace.

In Figs. VII and VIII which also relate to daily production, the container 13 is placed inside an enclosure 19 heated by flames from ports 20, in order to produce during the melting itself and consequently during the passage of the current through the glass bath 16, a heating exterior to the glass bath, such heating action spreading all around the container 13 and providing a particularly rapid melting requiring only a short time of contact of the glass with the electrodes. Such arrangement is favorable for the discontinuous production of hard glasses containing boric acid.

As in the previous example of Figs. V and VI, the electric current is supplied by electrodes 17 which are removed from the bath before the refining. Fig. VII shows the tank during the melting period before the container is full and Fig. VIII represents the tank during the refining period of the glass bath 21. In the first case, the electrodes are in the position 17a and in the second case in the position 17b. Refractory sheaths 22 may be provided for protecting the supporting means of the electrodes or the electrodes themselves against the contact of the flames during either of these periods.

According to our invention, in those discontinuous manufacturing methods, the action of the electric current and consequently the contact of the electrodes may be, as previously stated in the case of continuous furnaces, limited to a part of the melting period itself, the heating being effected at the beginning of the melting by any other means. In such a case, the electrodes are introduced only after the container is filled with a certain quantity of molten glass, thus obtaining a high intensity of the current as soon as it begins to pass through the glass.

What is claimed is:

1. A method for the manufacture of glass which comprises heating the glass making materials during the beginning of the melting operation by any suitable means other than the passage through the glass bath of an electric current supplied by electrodes, heating the glass bath during the following period of the melting operation by an electric current supplied to said bath by electrodes in contact with it, the contact of the glass with the electrodes being ended at the end of the melting operation, then refining said glass by any suitable heating means other than the passage through it of an electric current supplied by electrodes.

2. A method for the manufacture of glass which comprises heating the glass making materials during the beginning of the melting operation by any suitable means other than the passage through the glass bath of an electric current supplied by electrodes, heating the glass bath during the following period of the melting operation by an electric current supplied to said bath by electrodes in contact with it, the contact of the glass with the electrodes being ended before the end of the melting operation, then continuing the heating of said glass until it is refined by any suitable means other than the passage through it of an electric current supplied by electrodes.

3. A method for the manufacture of glass which comprises heating the glass making materials during at least a part of the melting operation simultaneously by heating means exterior to the glass bath and by the heat developed within the glass bath by the passage through it of an electric current supplied by electrodes in contact with said bath, the contact of the glass with electrodes being ended at the end of the melting operation, melted glass and the electrodes in the melting zone being separated by a barrier, then refining said glass by any suitable means other than the passage through it of an electric current supplied by electrodes.

4. A method for the manufacture of glass which comprises heating the glass making materials during at least a part of the melting operation simultaneously by heating means exterior to the glass bath and by the heat developed within the glass bath by the passage through it of an electric current supplied by electrodes in contact with said bath, the contact of the glass with electrodes being ended before the end of the melting operation, melted glass and the electrodes in the melting zone being separated by a barrier, then continuing the heating of said glass until it is refined by any suitable means other than the passage through it of an electric current supplied by electrodes.

5. A method for the manufacture of a glass having a low expansion coefficient containing boric acid which comprises heating the glass mass by an electric current passing through it and supplied by electrodes in contact with it, limiting the time of the contact of the glass with the electrodes to a part of the melting operation, then the contact of the glass with the electrodes being ended, and continuing the heating of the glass mass by any other heating means, until it is refined.

6. A method of making glass that comprises subjecting raw materials containing oxidizing substances to a melting operation by the joint action of heat applied to the interior of the glass mass and heat applied to the exterior thereof, and terminating the interior heating, while continuing the exterior heating, before the oxidizing substances introduced into the bath with the raw materials are wholly exhausted.

7. A method of making glass that comprises subjecting the raw materials to a melting operation by the joint action of heat applied to the interior of the glass mass and heat applied to the exterior thereof, terminating the interior heating prior to refining, and continuing the exterior heating into the refining stage of manufacture.

8. The method of making glass from raw materials including boric acid that includes the steps of establishing a pool of melted glass, melting raw materials including boric acid in said pool by heating means including flame and Joule effect, separating the melted glass from the Joule effect by a barrier before degradation by Joule effect electrode contact sets in, and heating the separated glass, while still separated, to refining temperature by flame.

9. A method for the manufacture of glass which comprises feeding glass-making materials to a glass bath, heating said bath during the period of the melting of said glass making materials by heating means comprising an electric current supplied to said bath by electrodes in contact with it, the contact of the glass with the electrodes being ended before the end of the melting operation, then completing the preparation of said glass by heat treatments out of contact with electric current.

10. A glass furnace having a dog house, a melting zone, an opening between the dog house and melting zone, the three electrodes of a three-phase system entering through the bottom of a furnace in triangular relation with a base of the triangle in the melting zone before said opening, the two electrodes forming the base of said triangle being adjacent the said opening at the sides thereof, a fining zone free of electrodes, and a barrier wall extending from the bottom of the furnace almost to the glass level thereof between the melting and fining zones acting to isolate the glass in the fining zone from the electrodes in the melting zone.

11. A method for the continuous manufacture of glass which comprises feeding glass-making materials to a glass bath in the melting zone of the container, heating the glass bath in said melting zone by an electric current passing through it between electrodes localized in said melting zone and by other heating means, having the glass pass from the melting zone to a subsequent refining zone while preventing any flow of the refined glass back to the melting zone, and heating the glass bath in the refining zone to refining temperature in the absence of corrodible electrodes.

12. A method for the continuous manufacture of glass which comprises feeding glass making materials to a glass bath, heating the glass bath in the melting zone of the container by an electric current passing through the bath between electrodes localized in a portion of said melting zone and by other heating means, having the glass pass from the melting zone to a subsequent refining zone while preventing any flow of the refined glass back to the melting zone, and heating the glass bath in the refining zone by any suitable means other than the passage of an electric current supplied to it by electrodes.

13. In an apparatus for the continuous manufacture of glass, a tank comprising a melting zone and a refining zone, electrodes localized in the melting zone of said tank and in contact with the glass bath in said zone, means to supply an electric current to said electrodes, means interposed between the melting zone and the refining zone providing a passage for the glass flowing from said melting zone to said refining zone, while preventing glass back currents, and burners so located as to direct flames above the glass bath from the refining zone towards the melting zone.

14. In an apparatus for the continuous manufacture of glass, a tank comprising a melting zone and a refining zone, electrodes localized in a portion of the melting zone, for supplying an electric current to the glass bath in said portion, a channel of small depth below the glass level connecting the portion of the tank containing the electrodes to the other portion of the melting zone, another channel of small depth below the glass level connecting the melting zone to the refining zone, and heating means for refining the glass other than electrodes supplying an electric current to the glass.

15. A glass furnace having a doghouse, a melting zone, an opening between doghouse and melting zone, three electrodes in triangular relation immersed in the glass with a base of the triangle in the melting zone before and adjacent said opening, said electrodes passing through the bottom of the furnace, a fining zone free of electrodes, and a barrier wall extending from the bottom of the furnace almost to the glass level thereof between the melting and fining zones acting to isolate the glass in the fining zone from the electrodes in the melting zone.

PIERRE ARBEIT.
ROBERT DUBOIS.
ROGER EMILE LAMBERT.

References Cited in the file of this patent

UNITED STATES PATENTS

| Number | Name | Date |
|---|---|---|
| 706,283 | Voelker | Aug. 5, 1902 |
| 766,771 | Richardson | Aug. 2, 1904 |
| 972,778 | Sauvegeon | Oct. 11, 1910 |
| 972,779 | Sauvegeon | Oct. 11, 1910 |
| 1,062,362 | Sauvageon | May 20, 1913 |
| 1,186,076 | Chambers | June 6, 1916 |
| 1,438,936 | Eimer | Dec. 12, 1922 |
| 1,593,054 | Arbeit | July 20, 1926 |
| 1,827,471 | Hitner | Oct. 13, 1931 |
| 1,880,541 | Wadman | Oct. 4, 1932 |
| 1,897,973 | Wadman | Feb. 14, 1933 |
| 1,905,534 | Wadman | Apr. 25, 1933 |
| 1,933,527 | Wadman | Oct. 31, 1933 |
| 1,944,855 | Wadman | Jan. 23, 1934 |
| 1,956,171 | Hitner | Apr. 24, 1934 |
| 1,970,112 | Wadman | Aug. 14, 1934 |
| 2,089,690 | Cornelius | Aug. 10, 1937 |
| 2,267,537 | Romazzotti | Dec. 23, 1941 |
| 2,283,188 | Cornelius | May 19, 1942 |
| 2,397,852 | Gentil | Apr. 2, 1946 |
| 2,413,037 | De Voe | Dec. 24, 1946 |

OTHER REFERENCES

Hopkins & Cousen, "Textbook of Glass Technology," D. Van Nostrand Co., 1925, p. 111.

"Glass Glossary," p. 8, The American Ceramic Society, 2525 North High St., Columbus, Ohio.